(12) United States Patent
Kane et al.

(10) Patent No.: US 8,584,165 B1
(45) Date of Patent: Nov. 12, 2013

(54) FACILITATING ACCESS TO CONTENT PROVIDED FROM MULTIPLE PROVIDERS

(75) Inventors: Francis J. Kane, Sammamish, WA (US);
Brian Goldstein, Seattle, WA (US);
Andrej Gregov, Seattle, WA (US);
Jordan M. Hay, Seattle, WA (US)

(73) Assignee: IMDb.com, Inc., Seattle, WA (US)

( * ) Notice: Subject to any disclaimer, the term of this patent is extended or adjusted under 35 U.S.C. 154(b) by 195 days.

(21) Appl. No.: 13/117,970

(22) Filed: May 27, 2011

(51) Int. Cl.
*G06F 3/00* (2006.01)
*H04N 7/16* (2011.01)
*H04N 5/445* (2011.01)
*H04N 7/173* (2011.01)
*G06F 13/00* (2006.01)
*G06F 3/048* (2013.01)
*G06F 17/30* (2006.01)

(52) U.S. Cl.
USPC ........ 725/44; 725/5; 725/38; 725/45; 725/46; 725/48; 725/61; 725/87; 725/104; 715/739; 715/747; 715/825; 707/784

(58) Field of Classification Search
None
See application file for complete search history.

(56) References Cited

U.S. PATENT DOCUMENTS

| | | | |
|---|---|---|---|
| 7,631,331 B2 * | 12/2009 | Sie et al. | 725/46 |
| 7,793,326 B2 * | 9/2010 | McCoskey et al. | 725/91 |
| 8,028,233 B1 * | 9/2011 | Florschuetz et al. | 715/716 |
| 2004/0117831 A1 * | 6/2004 | Ellis et al. | 725/53 |
| 2006/0155575 A1 * | 7/2006 | Gross | 705/1 |
| 2009/0249412 A1 * | 10/2009 | Bhogal et al. | 725/104 |
| 2011/0154399 A1 * | 6/2011 | Jin et al. | 725/46 |
| 2011/0214148 A1 * | 9/2011 | Gossweiler et al. | 725/46 |

OTHER PUBLICATIONS

Joshua Topolsky, Apple TV Review (2010), Sep. 29, 2010, Engadget, http://www.engadget.com/2010/09/29/apple-tv-review-2010/.*
Alexander Kent, Hands on Review: Tune in to Apple TV $2^{nd}$ Generation, Apr. 15, 2011, HomeServerLand, http://www.homeserverland.com/2011/04/hands-on-review-tune-in-to-apple-tv-2nd-generati.*

* cited by examiner

*Primary Examiner* — Hoang-Vu A Nguyen-Ba
(74) *Attorney, Agent, or Firm* — Thomas|Horstemeyer, LLP (57) ABSTRACT

Disclosed are various embodiments for facilitating access to content using availability information. Content programs are determined based at least in part on a prior selection of one or more of the content programs from a content catalog by a user. Content availability data is obtained from multiple content providers. Availabilities of each content program are determined based at least in part on the content availability data. A user interface is generated that presents the respective availabilities of each of the content programs through the corresponding interfaces of some or all of the content providers.

22 Claims, 7 Drawing Sheets

(12) United States Patent

US 8,584,165 B1

FACILITATING ACCESS TO CONTENT PROVIDED FROM MULTIPLE PROVIDERS

BACKGROUND

Content may be accessed in many different ways through a variety of media. For example, a movie may be viewed at a movie theater or at home. If viewed at home, the movie may be viewed, for example, from physical media such as a digital versatile disc (DVD) or BLU-RAY DISC®, broadcast services, video-on-demand services, and so on. Such services may be free or subscription based. Additionally, the movie may be viewed on the go with a mobile device such as, for example, a tablet computer, a smartphone, etc.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to assisting users in identifying available content and accessing such content. For example, a user may wish to watch a certain movie. There are many ways that the user may be able to watch the movie. For example, the user may be able to watch the movie at the theater, on premium cable television networks, on lower-tier cable television networks, on broadcast television, through video-on-demand, by renting a disc containing the movie by mail, and so on. It can be difficult for the user to sort through all the offerings of the various content providers to determine the best option. Depending on the user, the best option may, for example, be the least expensive or the fastest available. Further, depending on the availability of the movie through the various content providers, the user may want to watch another movie instead.

Various embodiments of the present disclosure allow a user to create a "watchlist" of various content items or programs (e.g., movies, television shows, audio tracks, etc.) that the user would like to consume. Content availability and pricing data is obtained from multiple content providers to which the user subscribes or can otherwise access. Availability and pricing for a desired content item is presented to the user through a user interface. The user interface enables the user to obtain the content (or initiate a request to obtain the content) by way of an interface with the desired content provider. In some embodiments, certain content items may be recommended to the user based on their availability to the user through the current computing device of the user. Although many examples are given herein relating to video content, it is understood that the principles of the present disclosure are applicable to audio content and/or other forms of content. In the following discussion, a general description of the system and its components is provided, followed by a discussion of the operation of the same.

Figure 1:
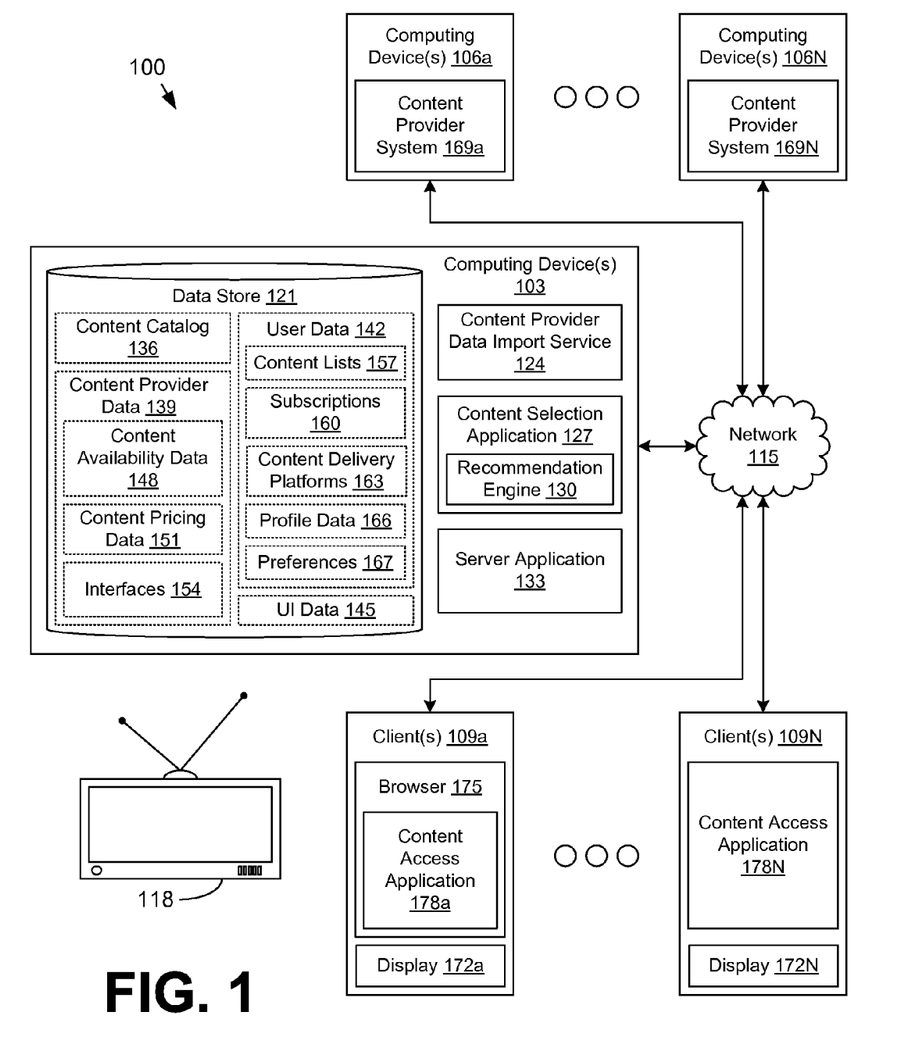
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with a plurality of computing devices 106a . . . 106N and a plurality of clients 109a . . . 109N by way of a network 115. The network 115 includes, for example, the Internet, intranets, extranets, wide area networks (WANs), local area networks (LANs), wired networks, wireless networks, or other suitable networks, etc., or any combination of two or more such networks. Also provided in the networked environment 100 may be one or more content access devices 118 which are configured to obtain content by way of a network 115 connection, a cable service, a satellite service, a broadcast service, a computer-readable storage medium, and so on. To this end, the content access devices 118 may correspond to televisions, radios, set-top boxes, satellite receivers, and/or other devices that are capable of accessing content.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 121 that is accessible to the computing device 103. The data store 121 may be representative of a plurality of data stores 121 as can be appreciated. The data stored in the data store 121, for example, is associated with the operation of the various applications and/or functional entities described below.

The components executed on the computing device 103, for example, include a content provider data import service 124, a content selection application 127, a recommendation engine 130, a server application 133, and other applications, services, processes, systems, engines, or functionality not discussed in detail herein. The content provider data import service 124 is executed to import pricing and availability data for content from various content providers. Such an import may occur periodically (e.g., daily, weekly, monthly, etc.) and may occur during times of less traffic on the network 115. The content selection application 127 is executed to facilitate selection of content and access to the selected content by users. In some embodiments, the content selection application 127 may obtain the pricing and availability data from the content providers.

The recommendation engine 130 may be configured to recommend various items of content, or instances of items of content available through a content provider, to users. Such content may be recommended based at least in part on its price, availability, quality, geographical proximity, and/or other factors. In some cases, the recommended content may be pre-selected by the user, while in other cases, the recommended content may be selected by the recommendation engine 130 based, for example, on similarities to other user-selected content, profile data associated with the user, and/or other data. Similarities used to drive recommendations may include content-based similarities (e.g., genre, director, actor, keywords, etc.) or user-behavior similarities (e.g., people who rated this movie highly also rated these other movies highly, etc.).

The server application 133 is executed to serve up network pages, such as web pages, gopher pages, interactive application data, or other forms of network content to clients 109. To this end, the server application 133 may include a commercially available hypertext transfer protocol (HTTP) server such as, for example, Apache® HTTP Server, Apache® Tomcat®, Microsoft® Internet Information Services (IIS), and so on.

The data stored in the data store 121 includes, for example, a content catalog 136, content provider data 139, user data 142, user interface data 145, and potentially other data. The content catalog 136 includes information relating to various content programs/items that may be selected through the content selection application 127. For example, where the content corresponds to video content, the content catalog 136 may include title, synopsis, description, names of cast members and production staff, year, rating, running time, promotional images, keywords, genres, reviews, unique identifiers, lists of different versions, and/or other information regarding the video content. Where the content corresponds to audio content, the content catalog 136 may include, for example, title, artist name, album name, names of band members, genres, keywords, cover art, year of release, label information, and so on. The content catalog 136 may be searchable on one or more fields.

The content provider data 139 includes various information obtained from content providers. Non-limiting examples of content providers for video content may include multi-channel system operators, video-on-demand network sites, video content rental services, kiosks, libraries, and so on. Non-limiting examples of content providers for audio content may include streaming audio services, audio-on-demand services, audio content vendors, broadcast radio services, subscription radio services, libraries, and so on. The content provider data 139 may include, for example, content availability data 148, content pricing data 151, interfaces 154, and/or other data.

The content availability data 148 describes the availability of various content programs through the content provider. In some cases, content may be scheduled and broadcast only at a certain time or times. In other cases, content may be available on-demand. Content that is available on-demand may be instantly available, available at a future time, available during one or more windows of time, available for ordering, and/or may have another type of availability. As a non-limiting example, a movie may be scheduled for broadcast via a subscription movie channel four times in the upcoming month. As another non-limiting example, the movie may be instantly available through a video-on-demand service. As yet another non-limiting example, the movie may be available to be ordered through a mail-based DVD rental service.

Content may also be available through an application executed through a television, a tablet, a mobile device, and so on. Content that is available through a television application, for example, may or may not also be available through a tablet, mobile device, etc. The content availability data 148 may also include information relating to what subscriptions, if any, are necessary in order to obtain the content through the content provider. The content availability data 148 may also include a geographic dimension, e.g., certain content may be available only within a certain country, market area, time zone, or other geographic area.

The content pricing data 151 describes prices associated with the available content through the content provider. In many cases, content may be free or freely available with a subscription. In other cases, accessing content may incur a charge. Such a charge may be a one-time charge, whereupon the content may be freely accessed after the one-time charge is assessed. Alternatively, each access of the content may incur a charge. It is understood that many different approaches to pricing content are possible, and the content pricing data 151 may provide information regarding the pricing under any approach for the content item.

The interfaces 154 for a content provider relate to how data is exchanged between applications executed on the computing device 103 and systems operated by the content provider. One aspect may relate to the importing of the content availability data 148 and/or the content pricing data 151 by the content provider data import service 124. Another aspect may relate to arranging for a user to access content from the content provider. To this end, the interfaces 154 may provide approaches for ordering, scheduling, purchasing, downloading, and/or otherwise accessing content from the content provider. In some embodiments, the interfaces 154 may comprise plug-ins or other code executable in the client 109 that facilitate access to the content from the content provider.

The user data 142 includes various information about users of the content selection application 127 who may search for and consume content. For example, the user data 142 may include one or more content lists 157, subscriptions 160, content delivery platforms 163, profile data 166, preferences 167, and/or other data. Each of the content lists 157 includes one or more items or programs of content in which the user has indicated an interest. In one embodiment, the user may search for content through a content search engine and add content items of interest to a content list 157, or "watch list." In one embodiment, the recommendation engine 130 may be configured to add other recommended content to the content list 157 of a user. In some embodiments, the content lists 157 may include content lists 157 of friends and/or other people.

The subscriptions 160 correspond to content channel or platform subscriptions that are currently active for the user. The subscriptions 160 may also include subscriptions that were active in the past for the user. The subscriptions 160 may include cable or television networks to which the user is subscribed, DVD rental services to which the user is subscribed, satellite radio service subscriptions, video-on-demand service subscriptions, and so on. The content delivery platforms 163 correspond to the different platforms through which the user may be able to obtain content. For example, a user may have a cable television service with a digital-video-recorder set-top box, a broadband Internet connection for video-on-demand, a smartphone with broadband access, and/or other content delivery platforms 163. The subscriptions 160 may include security credentials and/or other authentication data that may be used by the content selection application 127 to facilitate access to content covered by one or more subscriptions 160. Also, the subscriptions 160 may include payment instruments and/or other data to facilitate payment for content covered by one or more subscriptions 160.

Each user may be associated with various profile data 166. The profile data 166 may indicate explicit or implicit preferences for different types of content. To this end, the profile data 166 may include content purchase history, content browse history, content selection history, social network data, and/or other data. In addition, each user may be associated with various preferences 167. The preferences 167 may, for example, indicate explicit preferences for certain genres or types of content, preferred movie theaters, favorite video-on-demand services, favorite subscriptions 160, and other types of preferences.

The user interface (UI) data 145 may include any data related to user interfaces that are presented to users, such as embodied in network pages and applications. To this end, the user interface data 145 may include text, code, templates, graphics, images, audio, video, etc.

Each of the computing devices 106 may comprise, for example, a server computer or any other system providing computing capability. Alternatively, a plurality of computing devices 106 may be employed that are arranged, for example, in one or more server banks or computer banks or other arrangements. For example, a plurality of computing devices 106 together may comprise a cloud computing resource, a grid computing resource, and/or any other distributed computing arrangement. Such computing devices 106 may be located in a single installation or may be distributed among many different geographical locations. For purposes of convenience, each computing device 106 is referred to herein in the singular. Even though each computing device 106 is referred to in the singular, it is understood that a plurality of computing devices 106 may be employed in the various arrangements as described above.

Various applications and/or other functionality may be executed in each computing device 106 according to various embodiments. The components executed on the computing device 106, for example, include a respective one of a plurality of content provider systems 169a . . . 169N and other applications, services, processes, systems, engines, or functionality not discussed in detail herein. Each content provider system 169 corresponds to a system operated by a respective content provider that facilitates access to content availability data 148, content pricing data 151, and/or other data regarding content that is available from the content provider. The content provider system 169 may be executed to provide access to such data to the content provider data import service 124, the content selection application 127, and/or other services. Furthermore, the content provider system 169 may support various functions relating to the access of content, such as scheduling the recording of a content program in a digital video recorder, ordering a pay-per-view program, ordering a DVD to be delivered by mail, and so on. In some embodiments, the content provider system 169 may provide the clients 109 and/or the content access devices 118 with access to the content over the network 115 or some other communication network.

Each of the clients 109a . . . 109N may comprise, for example, a processor-based system such as a computer system. Such a computer system may be embodied in the form of a desktop computer, a laptop computer, personal digital assistants, cellular telephones, smartphones, set-top boxes, digital video recorders, music players, web pads, tablet computer systems, network-enabled televisions, game consoles, electronic book readers, or other devices with like capability. Each of the clients 109 may include one or more output devices, such as a respective display 172a . . . 172N. Each display 172 may comprise, for example, one or more devices such as cathode ray tubes (CRTs), liquid crystal display (LCD) screens, gas plasma-based flat panel displays, LCD projectors, or other types of display devices, etc.

Each client 109 may be configured to execute various applications such as a browser 175, a content access application 178, and/or other applications. The browser 175 may be executed in a client 109, for example, to access and render network pages, such as web pages, or other network content served up by the computing device 103 and/or other servers. The content access application 178 is executed to obtain and access content from a content provider system 169. For example, the content access application 178 may be a video player that plays out on-demand video content from one of the content provider systems 169.

It is noted that there may be multiple content access applications 178 on a client 109 in some embodiments in order to access content from multiple content provider systems 169. In one embodiment, the content access application 178 is a plug-in or other code executed by the browser 175, while in another embodiment, the content access application 178 is a standalone application. The client 109 may be configured to execute applications beyond the browser 175 and the content access application 178 such as, for example, email applications, instant message applications, and/or other applications.

Next, a general description of the operation of the various components of the networked environment 100 is provided. To begin, the content provider data import service 124 may import various data from multiple content providers from corresponding content provider systems 169. The data may include the content availability data 148, the content pricing data 151, and/or other data. The data may be imported as a batch at specified intervals. Alternatively, the data may be imported on demand as needed to respond to content selection requests from users.

A user at a client 109 establishes an account with the content selection application 127 and various user data 142 is populated for the user. The user builds one or more content lists 157 that contain items or programs of content which the user wishes to view or otherwise consume. In various embodiments, the user at the client 109 may interact with the content selection application 127 via one or more network pages or other data served up by the server application 133. Such network pages or other data may include dynamic content and may include code to implement accessing content from the content provider systems 169 via a content access application 178.

The content selection application 127 encodes a user interface for rendering on the client 109 that facilitates a user selection of content from a content list 157. The content list 157 may be ordered according to a predefined order from the user, price, availability, and other factors. The respective availabilities of the content programs may be presented in an order based at least in part on a respective time until the content program is available for consumption from a content provider.

As a non-limiting example, a content list 157 may include movies that the user is interested in watching, and the user may select one of the movies on the list. In response, the content selection application 127 determines availability and price information for the selected content from content availability data 148 and content pricing data 151 from multiple content providers. The availability of the content may be further based at least in part on a subscription 160 status of the user for a particular content provider. The content selection application 127 is able to recommend a subset of the content, a selection of a content provider, and/or instance of the content to the user. Such recommendations may be made on best price, best availability (e.g., earliest in time, closest in distance, etc.). The content selection application 127 may employ the recommendation engine 130 to recommend additional content to the user as well.

The user is able to select the content and content provider in order to access and consume the content. The content may be made available from multiple content providers through multiple content delivery media. When a user selects a content program and content provider via a user interface, the content selection application 127 is able to arrange for the content to be ordered, reserved, recorded, etc. from the content provider through the content provider system 169. If the content is capable of being immediately consumed by the client 109, the content selection application 127 is able to arrange such consumption via an appropriate interface 154 such as a video player, video rental application, set-top box interface, and so on. For example, the interface 154 may be sent to the client 109 over the network 115. Thus, the client 109 may be able to directly consume the content through a content access application 178 that executes or otherwise implements the interface 154 to the content provider system 169.

In various embodiments, the content access application 178 may function as a remote control for a digital video recorder, set-top box, television, etc. in order to consume the content. To this end, the content delivery platforms 163 of the user may be configured with data describing the various remote-capable devices of the user to facilitate remote control of such devices. The remote-capable devices may have infrared interfaces 154, Bluetooth interfaces 154, Wi-Fi interfaces 154, and/or other types of interfaces 154 which may or may not be coupled to the network 115.

In some cases, the user may use a content access device 118 such as a television, satellite radio, etc. to access the content at a later scheduled time. In other cases, the content selection application 127 may be configured to facilitate access to a live event (e.g., theater performance, etc.) where the content may be consumed. In such a case, the content access application 178 may be configured to facilitate printing a ticket or otherwise registering for the live event.

In some embodiments, a list of content derived at least in part from the content list 157 and the price, availability, quality, etc. may be presented to the user. Such a list may further be based at least in part on the type of computing device that corresponds to the client 109. For example, if the client 109 is a smartphone with a broadband connection, the listing of content may be based at least in part on the availability of the content for immediate viewing through the smartphone. Such a list may also be based at least in part on a geographical proximity of the client 109 (determined, e.g., through a global positioning system (GPS) device of the client 109 or by another approach) to theaters showing the content, how many friends through a social network are watching or have watched the content, and so on.

Figure 2A:
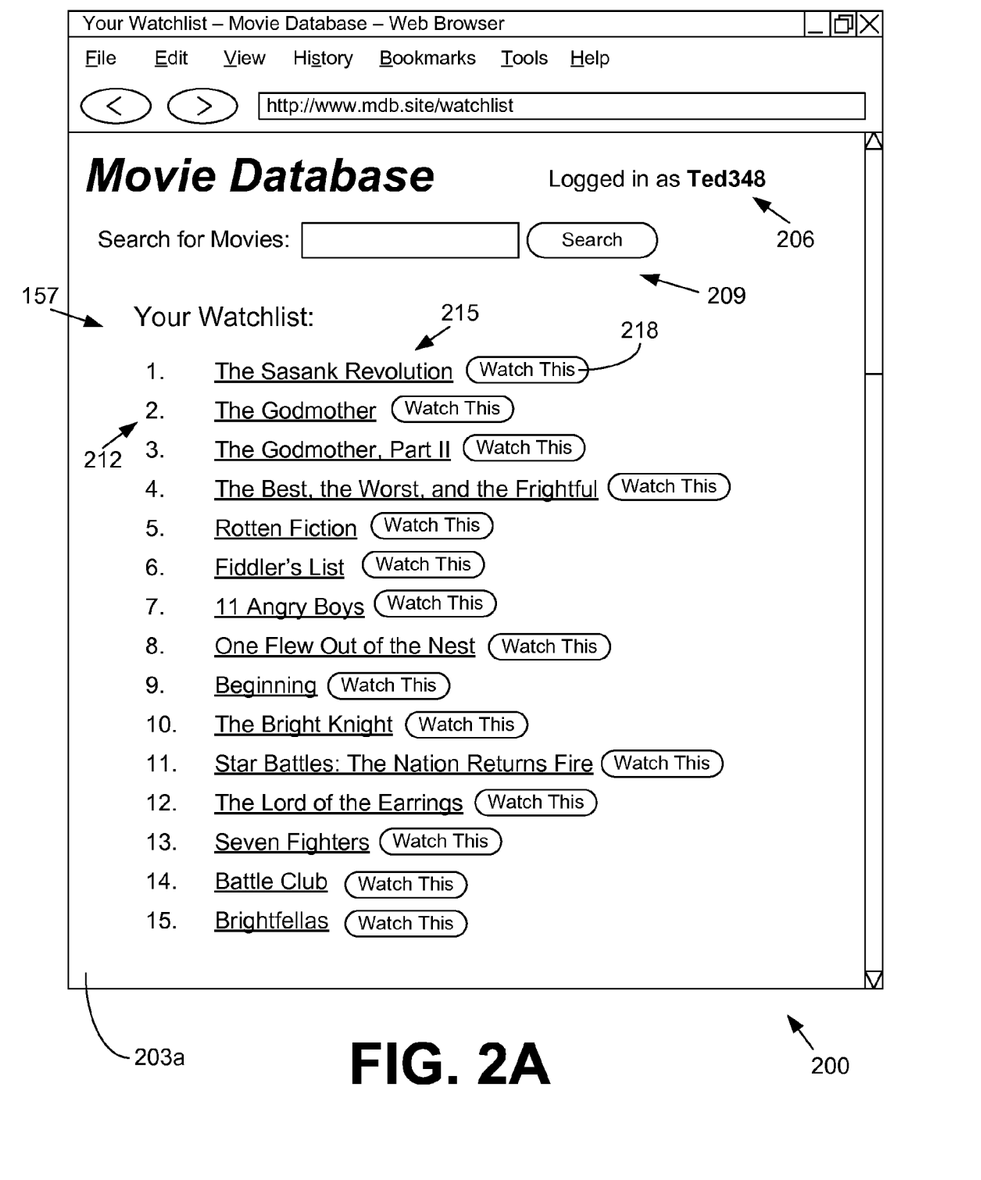
FIGS. 2A-2C are drawings of examples of user interfaces rendered by clients in the networked environment of FIG. 1 according to various embodiments of the present disclosure.

Referring next to FIG. 2A, shown is one example of a user interface 200 rendered by a browser 175 (FIG. 1) executed in a client 109 (FIG. 1) in the networked environment 100 (FIG. 1). In particular, FIG. 2A depicts a rendered network page 203a that displays the contents of a content list 157 (FIG. 1) of a user. The content list 157 may belong to the user who has requested the network page 203a or another user such as a friend, professional content reviewer, and so on. Here, the rendered network page 203a includes a user indication 206 that indicates which user is currently logged in to, or otherwise recognized by, the content selection application 127 (FIG. 1) through the browser 175. The rendered network page 203 also includes a content search tool 209 that allows the user to enter a search query and find content from the content catalog 136 that relates to the search query.

The content list 157, in this non-limiting example, corresponds to a "watch list" of movies that have been pre-selected by the user. Each movie in the watch list is depicted as having a respective rank 212, a respective title 215, and a respective watch tool 218. In other examples, other information may be presented in connection with each content item in a content list 157. Although the movies are depicted in an order specified by the rank 212, it is understood that the content items may be ordered randomly, alphabetically, chronologically, or according to some other order. In some embodiments, the user may be able to rearrange the order of the content list 157, filter the content, or organize the content into multiple content lists 157 to represent their preference or interest in the content items.

The title 215 of each movie is depicted as being a hyperlink. Such a hyperlink may lead, for example, to a detail network page with further information about the respective movie. The watch tool 218 is depicted as a button labeled "Watch This." It is understood that the watch tool 218 may include other user interface components in other embodiments. Upon selecting the watch tool 218, the user may be presented with various options to watch the movie or otherwise to access the specific program of content.

Figure 2B:
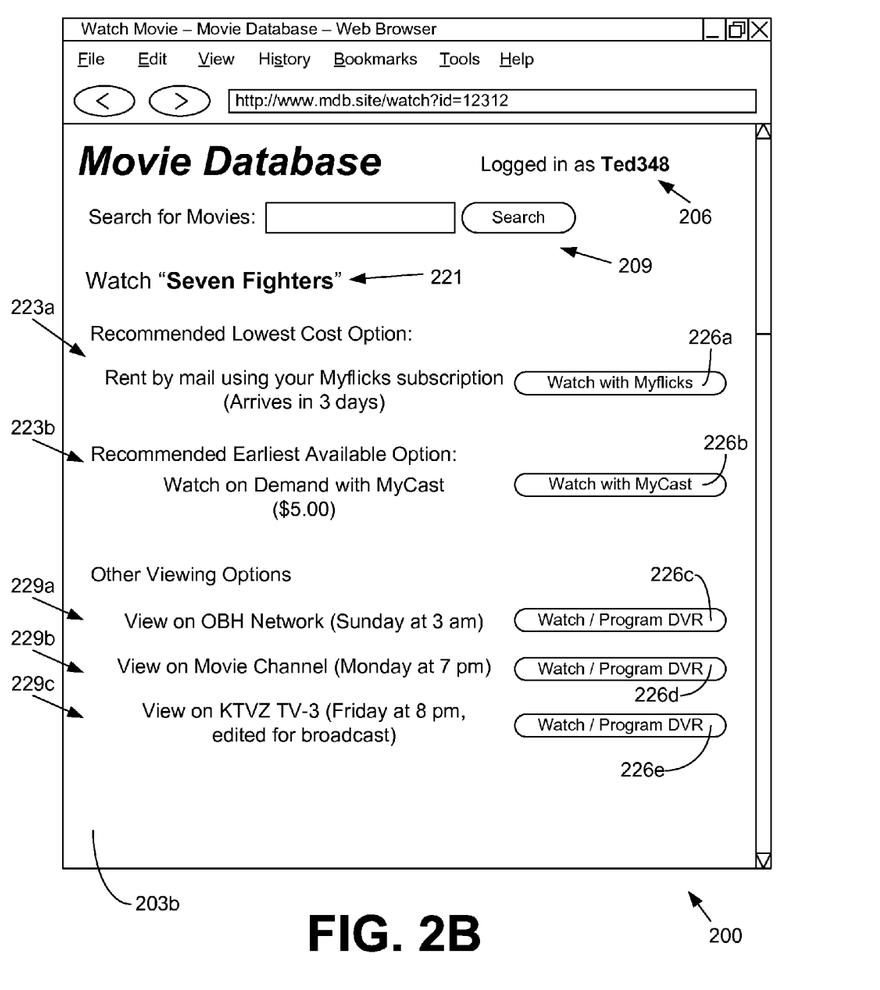

Turning now to FIG. 2B, shown is another example of a user interface 200 rendered by a browser 175 (FIG. 1) executed in a client 109 (FIG. 1) in the networked environment 100 (FIG. 1). In particular, FIG. 2B depicts a rendered network page 203b that displays the result of selecting a movie with the corresponding watch tool 218 from FIG. 2A. In this example, a title indication 221 indicates that the movie "Seven Fighters" has been selected in the rendered network page 203b. Based at least in part on the user data 142 (FIG. 1), the content selection application 127 (FIG. 1) has determined several recommended and available options for consuming the selected item of content.

The rendered network page 203b includes a recommended option 223a based at least in part on cost. In this non-limiting example, the content selection application 127 has determined that the lowest-cost option is to rent the item of content by mail from a content provider through which the user has a subscription 160 (FIG. 1). The estimated time of arrival is given as three days. A content access tool 226a is provided to initiate an order of the content item through the specified content provider.

The rendered network page 203b also includes a recommended option 223b based at least in part on delivery time. In this non-limiting example, the content selection application 127 has determined that the option with the earliest delivery time is to watch the content program on demand through a video-on-demand content provider. This option, however, is associated with a $5.00 fee. A content access tool 226b is provided to initiate obtaining the content item to be viewed on-demand by the user.

Although two types of recommendations (lowest cost content, earliest available content) are shown in the example of FIG. 2B, it is understood that other types of recommendations may be presented. In some cases, a recommendation based at least in part on content quality may be presented. For example, content may be recommended because it has the highest resolution. An indication of content quality may be provided in connection with each content item. In some cases, a recommendation based at least in part on a subjective entertainment factor may be presented. For example, some options may be presented as "more fun" than others, such as when content includes a "sing-along" feature, etc. A movie theater showing in 3D and with an extra-large screen may be presented as a recommended option over a movie theater showing with a normal size screen and 2D. Content may also be recommended based at least in part on geographical proximity to the user, e.g., nearest movie theater, nearest video rental kiosk, and so on.

Other options 229a, 229b, and 229c are also provided. Option 229a indicates that the movie is available for viewing on "OBH Network" on Sunday at 3 am. Option 229b indicates that the movie is available for viewing on "Movie Channel" on Monday at 7 pm. Option 229c indicates that the movie is available for viewing on "KTVZ TV-3" on Friday at 8 pm. Option 229c also indicates that the version of the movie is edited for broadcast. Corresponding content access tools 226c, 226d, and 226e are provided in association with the options 229a, 229b, and 229c.

As the options 229a, 229b, and 229c correspond to broadcasts of the movie over either subscription or broadcast television channels, the corresponding content access tools 226c, 226d, and 226e facilitate a recording of the broadcast through, for example, a digital video recorder. To this end, selection of a content access tools 226c, 226d, and 226e may cause communication with the corresponding content provider system 169 in order to schedule the recording through the digital video recorder of the user. In some embodiments, a command may be sent to a set-top box or other device of the user to configure the device to record the program as desired. Instead of recording, the content access tools 226c, 226d, and 226e may cause a content access application 178 (FIG. 1) or a content access device 118 (FIG. 1) to be tuned to the particular channel at the given time to facilitate viewing. Other tasks to facilitate access to the content may be initiated by way of the user interface 200 in other embodiments.

Figure 2C:
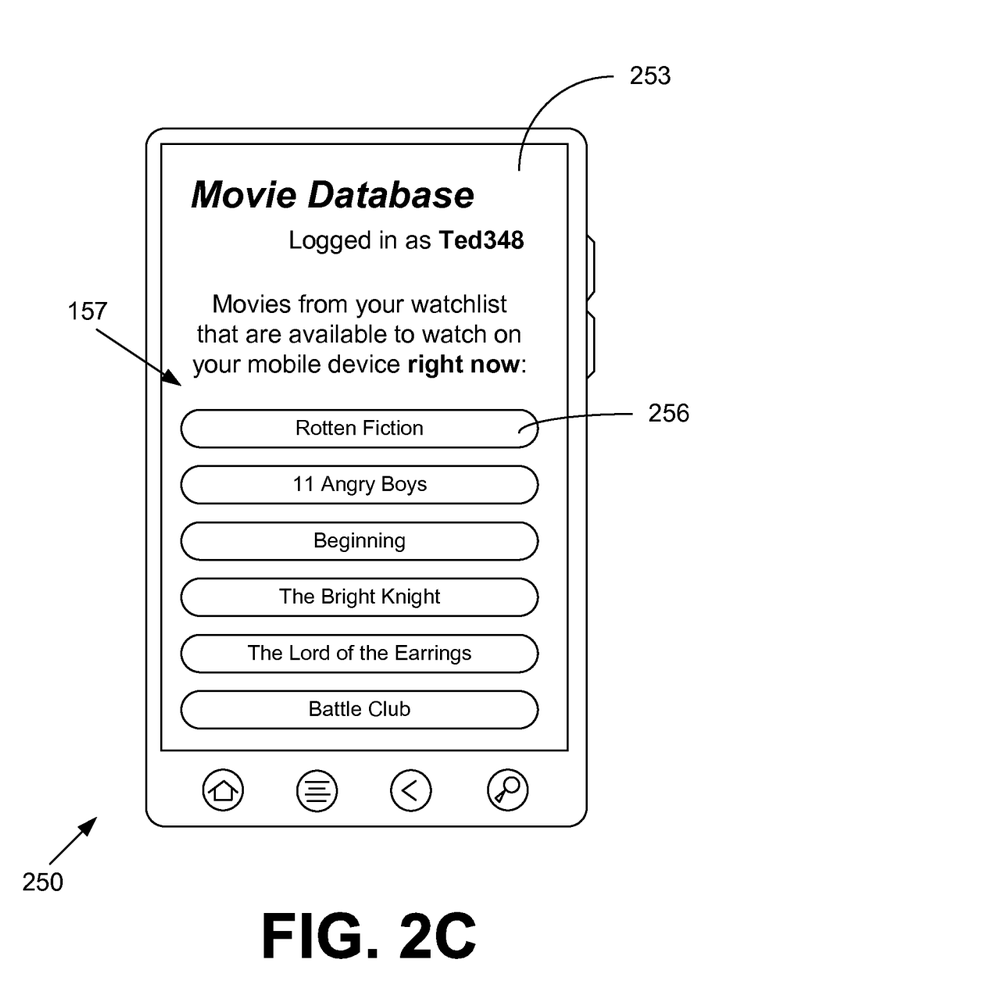

Moving on to FIG. 2C, shown is an example of a user interface 250 rendered in a client 109 (FIG. 1) in the networked environment 100 (FIG. 1). In this non-limiting example, the user interface 250 corresponds to a smartphone or other handheld computing device with a screen 253 on the display 172 (FIG. 1) generated by a content access application 178 (FIG. 1). Although FIG. 2C relates to a user interface 250 of a mobile computing device, it is understood that similar user interfaces 250 may be rendered on television screens by televisions, set-top boxes, etc.

As in FIG. 2A, the screen 253 shows a content list 157 corresponding to a movie watch list of the user. However, compared with the content list 157 shown in FIG. 2A, only a subset of the content that is currently available to be accessed is shown. Further, the content that is shown is represented to be currently available to be accessed through the particular client 109 that is in use, as opposed to some other computer, set-top box, or television.

Content access tools 256, such as buttons, links, or other interface components, are provided to launch the playback of the corresponding content through the user interface 250. For someone with a smartphone and some spare time, the content access application 178 facilitates accessing desired content from the content list 157 instantly while on the go. By selecting, for example, the content access tool 256 labeled "Rotten Fiction," the corresponding movie is located from a content provider offering the movie on demand in a format suitable for streaming to the smart phone. Using an interface 154, the content may be streamed from the content provider system 169 (FIG. 1) to the smartphone for playback on the display 172. Alternatively, the smartphone may be capable of controlling devices such as televisions, set-top boxes, media center computers, etc., via wireless networks, infrared signals, and/or other communication media. In some embodiments, the content list 157 of the user may be augmented with other content that is recommended based at least in part on current selections in the content list 157, content purchased by the user, declared interests of the user, and/or on other data.

Figure 3A:
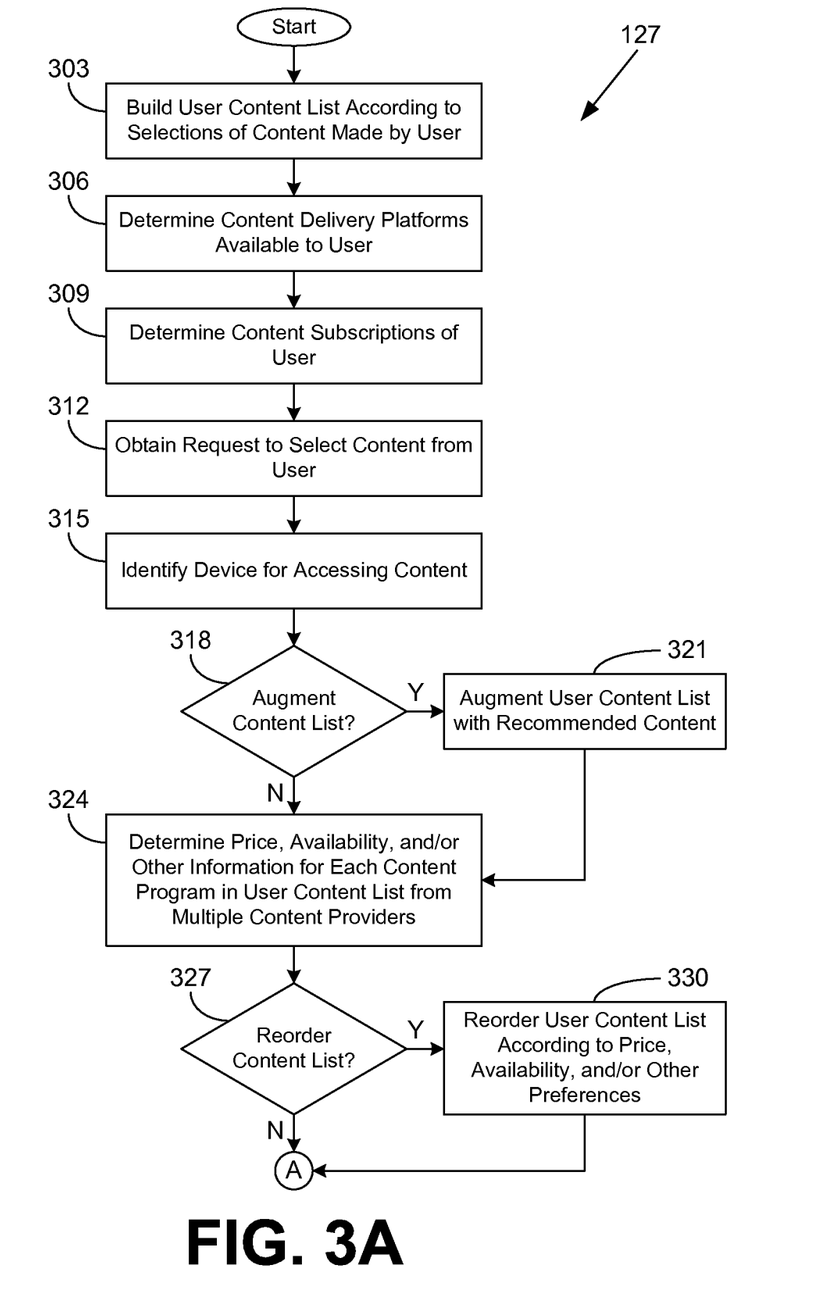
FIGS. 3A and 3B depict a flowchart illustrating one example of functionality implemented as portions of a content selection application executed in a computing device in the networked environment of FIG. 1 according to various embodiments of the present disclosure.
Figure 3B:
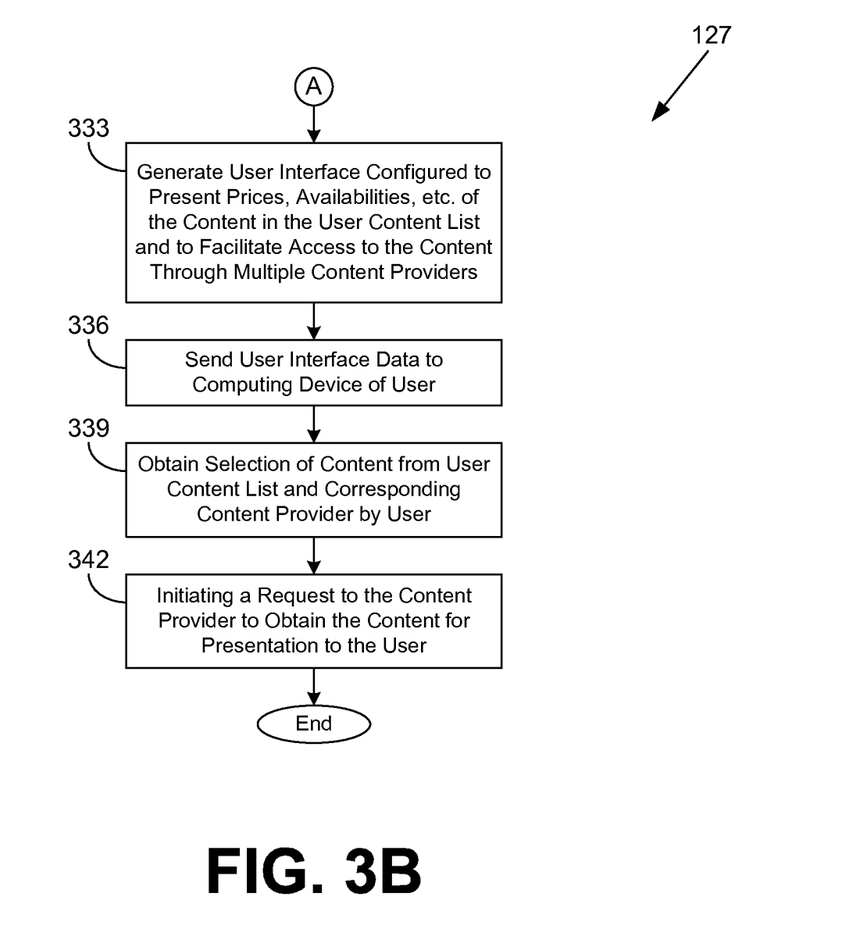

Referring next to FIGS. 3A and 3B, shown is a flowchart that provides one example of the operation of a portion of the content selection application 127 according to various embodiments. It is understood that the flowchart of FIGS. 3A and 3B provides merely an example of the many different types of functional arrangements that may be employed to implement the operation of the portion of the content selection application 127 as described herein. As an alternative, the flowchart of FIGS. 3A and 3B may be viewed as depicting an example method implemented in the computing device 103 (FIG. 1) according to one or more embodiments.

Beginning with box 303 of FIG. 3A, the content selection application 127 builds a user content list 157 (FIG. 1) according to one or more selections of content made by a user. For example, a user may search for various content using a content search interface and indicate that content in the search results should be added to the content list 157. In box 306, the content selection application 127 determines the content delivery platforms 163 (FIG. 1) available to the user. The user may have access, for example, to a television with cable, a desktop computer with a broadband connection, a smartphone with wireless broadband, a BLU-RAY DISC® rental kiosk, and so on.

In box 309, the content selection application 127 determines the content subscriptions 160 (FIG. 1) of the user. For instance, the user may have a cable television subscription 160 that includes access to a tier of cable television networks, a subscription 160 to a DVD rental service by mail that allows the user to have two DVDs rented at a time, a subscription 160 to an online video-on-demand service, and/or other subscriptions 160. In box 312, the content selection application 127 obtains a request to select content from a user at a client 109 (FIG. 1) over the network 115 (FIG. 1). The request may specify a time or time window wherein the content is to be accessed. If the request does not specify a time or time window, the content selection application 127 may assume a default time or time window (e.g., now, during the next day, during the next week, etc.).

In box 315, the content selection application 127 identifies the device to be used for accessing content. In one case, the content selection application 127 may identify the current computing device in use by the user at the client 109, which may determine the content that is currently available for consumption at the client 109. In another case, the content selection application 127 may identify another device for accessing content that the user has indicated will be used now or at another time.

In box 318, the content selection application 127 determines whether the content list 157 is to be augmented with additional recommended content. For example, the content list 157 may contain relatively few content items, or few items of content in the content list 157 may be available for consumption at the client 109. If the content selection application 127 determines that the content list 157 is to be augmented, the content selection application 127 moves to box 321 and augments the content list 157 to include recommended content selected by the recommendation engine 130. The content selection application 127 then proceeds to box 324. If the content list 157 is not to be augmented, the content selection application 127 also proceeds to box 324.

In box 324, the content selection application 127 determines price, availability, quality, and/or other information for each content program in the content list 157 from the content availability data 148 (FIG. 1) and the content pricing data 151 (FIG. 1) from multiple content providers. In box 327, the content selection application 127 determines whether the content list 157 is to be reordered. As a non-limiting example, it may be desirable to reorder the content list 157 based on the availability, price, quality, or other factors associated with the various programs or items in the content list 157. If the content list 157 is to be ordered, the content selection application 127 moves to box 330 and reorders the content list 157 of the user according to price, availability, quality, and/or other factors. The content selection application 127 then proceeds to box 333 of FIG. 3B. If the content list 157 is not to be reordered, the content selection application 127 also proceeds to box 333 of FIG. 3B.

In box 333, the content selection application 127 generates a user interface configured to present prices and/or availabilities of content in the content list 157 and to facilitate access to the content through multiple content providers. Non-limiting examples of such a user interface are depicted in FIGS. 2A, 2B, and 2C. In box 336, the content selection application 127 sends user interface data to the current computing device of the user (i.e., a client 109). In box 339, the content selection application 127 obtains a selection of content from the content list 157 and a selection of a corresponding content provider by the user. It is noted that the selections may be made through one or multiple user interfaces. In one non-limiting example, a user may select the content first, and then select the content provider based at least in part on price/availability. In another non-limiting example, the user may select the content and content provider together, where the content provider is predetermined based at least in part on price/availability.

In box 342, the content selection application 127 initiates a request to the content provider through the content provider system 169 (FIG. 1) to obtain the selected content for presentation to the user. To this end, the content selection application 127 may employ a corresponding interface 154 for the content provider. In some cases, the interface 154 may be provided to the content access application 178 (FIG. 1) on the client 109 of the user in order to access and consume the content from the content provider system 169. In other cases, the interface may be used by the content selection application 127 to arrange for the content to be recorded, ordered, rented, and/or accessed by a content access device 118 or a client 109. Thereafter, the portion of the content selection application 127 ends.

Figure 4:
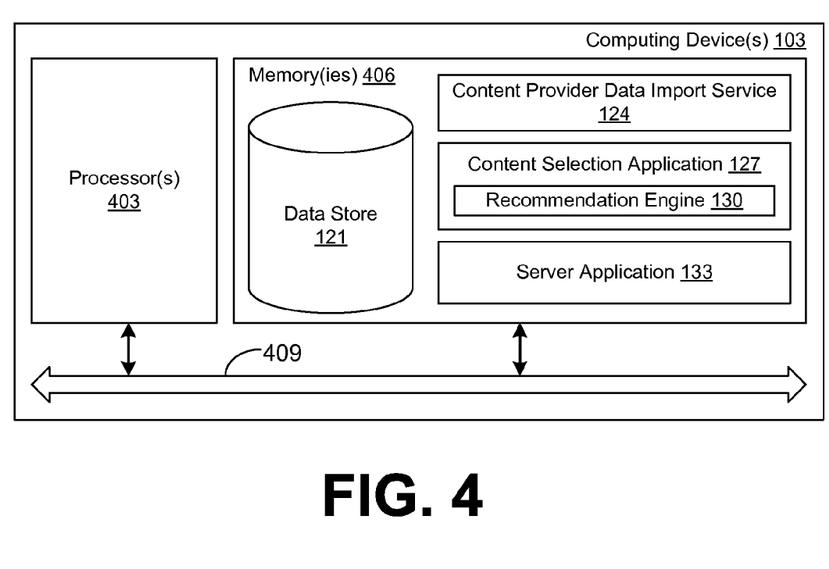
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the content provider data import service 124, the content selection application 127, the recommendation engine 130, the server application 133, and potentially other applications. Also stored in the memory 406 may be a data store 121 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 115 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the content provider data import service 124, the content selection application 127, the recommendation engine 130, the server application 133, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIGS. 3A and 3B shows the functionality and operation of an implementation of portions of the content selection application 127. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIGS. 3A and 3B shows a specific order of execution, it is understood that the order of execution may differ from that which is depicted. For example, the order of execution of two or more blocks may be scrambled relative to the order shown. Also, two or more blocks shown in succession in FIGS. 3A and 3B may be executed concurrently or with partial concurrence. Further, in some embodiments, one or more of the blocks shown in FIGS. 3A and 3B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the content provider data import service 124, the content selection application 127, the recommendation engine 130, and the server application 133, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying a program executable in a computing device, the program comprising:

code that determines a list of video programs that includes at least one video program that is pre-selected by a user from a content catalog and at least one video program that is recommended to the user based at least in part on profile data associated with the user;

code that determines a plurality of availabilities comprising a price and a corresponding availability for each of the video programs through each of a plurality of video providers based at least in part on a subscription status of the user with the respective video provider, the corresponding availability indicating a length of time until the respective video program is available through the respective video provider, a first one of the video providers employing a first video delivery medium, a second one of the video providers employing a second video delivery medium that is different from the first video delivery medium;

code that generates a user interface that presents the plurality of availabilities of the video programs from the video providers to the user, facilitates access to the video programs by the user through a plurality of corresponding interfaces of at least some of the video providers, and recommends at least one of the video programs to the user;

code that obtains a selection of one of the video programs and one of the video providers from the user through the user interface; and code that initiates a request to the one of the video providers to obtain the one of the video programs for viewing by the user.

2. A system, comprising:

at least one computing device; and a content selection application executable in the at least one computing device, the content selection application comprising:

logic that determines a plurality of content programs based at least in part on a prior selection of at least one of the content programs from a content catalog by a user;

logic that obtains content availability data from a plurality of content providers;

logic that determines a plurality of availabilities of each of the plurality of content programs, the plurality of availabilities comprising a respective availability to each of the plurality of content providers, based at least in part on content availability data; and logic that generates a user interface that concurrently presents the plurality of availabilities of at least one of the plurality of content programs.

3. The system of claim 2, wherein the content selection application further comprises logic that launches a corresponding interface of at least one of the plurality of content providers to access one of the plurality of content programs in response to obtaining a selection of the one of the plurality of content programs from the user through the user interface.

4. The system of claim 3, wherein the user interface is further configured to remotely control a device in order to access the one of the content programs.

5. The system of claim 3, wherein the corresponding interface facilitates purchasing a ticket to view a performance of one of the content programs at a theater.

6. The system of claim 3, wherein the corresponding interface facilitates scheduling a recording of one of the content programs.

7. The system of claim 3, wherein the corresponding interface facilitates initiating a video-on-demand session to view the one of the content programs.

8. The system of claim 2, wherein at least one of the content programs is selected by a friend of the user on a social network.

9. The system of claim 2, wherein the user interface is further configured to present a respective price in association with each of the availabilities.

10. The system of claim 2, wherein the user interface is further configured to present a respective content quality indicator in association with each of the availabilities of the content programs.

11. The system of claim 2, wherein the logic that determines the availabilities of each of the content programs is further configured to determine the availabilities of each of the content programs based at least in part on a subscription status of the user.

12. The system of claim 2, wherein the content selection application further comprises logic that identifies a computing device in use by the user, and the logic that determines the availabilities of each of the content programs is further configured to determine the availabilities of each of the content programs based at least in part on the computing device in use by the user.

13. The system of claim 2, wherein the content programs corresponds to video content.

14. The system of claim 2, wherein the content programs is previously selected by the user.

15. The system of claim 2, wherein the plurality of availabilities of the content programs are presented in an order based at least in part on a list of content programs ordered by the user.

16. The system of claim 2, wherein the plurality of availabilities of the content programs are presented in an order based at least in part on a respective price.

17. The system of claim 2, wherein the plurality of availabilities of the content programs are presented in an order based at least in part on a respective time until a corresponding content program is available for consumption from at least one of the plurality of content providers.

18. A method, comprising the steps of:
determining, in at least one computing device, a list of video programs that are pre-selected by a user from a content catalog;
determining, in the at least one computing device, a plurality of availabilities for each video program in the list of video programs, each of the availabilities comprising an availability for the video program through each of a plurality of video providers;
generating, in the at least one computing device, a user interface that simultaneously presents each of the availabilities of one of the video programs in the list of video programs to the user;
obtaining, in the at least one computing device, a selection of one of the video programs and one of the video providers from the user through the user interface; and
initiating, in the at least one computing device, a request to the one of the video providers to obtain the one of the video programs for viewing by the user in response to the selection.

19. The method of claim 18, further comprising the step of adding, in the at least one computing device, at least one other video program to the list of video programs based at least in part on data associated with the user.

20. The method of claim 18, further comprising the step of recommending, in the at least one computing device, a subset of the list of video programs to the user based at least in part on the plurality of availabilities for each video program.

21. The method of claim 18, wherein the plurality of availabilities for each video program is based at least in part on a subscription status of the user.

22. The method of claim 18, wherein the request comprises a request to program a digital video recorder of the user to record at least one of the video programs in the list of video programs.

* * * * *